(12) United States Patent
Toyora (10) Patent No.: US 10,124,803 B2
(45) Date of Patent: Nov. 13, 2018

(54) VEHICLE CONTROL APPARATUS

(71) Applicant: TOYOTA JIDOSHA KABUSHIKI KAISHA, Toyota-shi, Aichi-ken (JP)

(72) Inventor: Sachio Toyora, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 37 days.

(21) Appl. No.: 15/479,715

(22) Filed: Apr. 5, 2017

(65) Prior Publication Data

US 2017/0313315 A1 Nov. 2, 2017

(30) Foreign Application Priority Data

Apr. 28, 2016 (JP) ................................. 2016-091421

(51) Int. Cl.
| | |
|---|---|
| *B60W 30/18* | (2012.01) |
| *B60W 10/02* | (2006.01) |
| *B60W 10/06* | (2006.01) |
| *B60W 50/00* | (2006.01) |
| *B60K 6/485* | (2007.10) |

(52) U.S. Cl.
CPC ....... *B60W 30/18072* (2013.01); *B60K 6/485* (2013.01); *B60W 10/02* (2013.01); *B60W 10/06* (2013.01); *B60W 50/0098* (2013.01); *B60W 2030/1809* (2013.01); *B60W 2050/0089* (2013.01); *B60W 2540/10* (2013.01); *B60W 2540/106* (2013.01); *B60W 2540/12* (2013.01); *B60W 2540/14* (2013.01); *B60W 2540/16* (2013.01); *B60W 2710/021* (2013.01); *B60W 2710/0644* (2013.01); *B60W 2710/0655* (2013.01); *Y02T 10/76* (2013.01)

(58) Field of Classification Search
CPC ............................................ B60W 2030/1809
See application file for complete search history.

(56) References Cited

U.S. PATENT DOCUMENTS

| | | | |
|---|---|---|---|
| 9,031,727 B2 | 5/2015 | Miyazaki et al. | |
| 2012/0325042 A1* | 12/2012 | Takiguchi | B60W 10/06 74/513 |

(Continued)

FOREIGN PATENT DOCUMENTS

| | | |
|---|---|---|
| JP | 2014-088825 A | 5/2014 |
| WO | 2013/027288 A1 | 2/2013 |

*Primary Examiner* — Tisha D Lewis
(74) *Attorney, Agent, or Firm* — Hunton Andrews Kurth LLP (57) ABSTRACT

A vehicle control apparatus for controlling a vehicle including an engine, a motor generator, a manual transmission, a clutch, an accelerator pedal, a clutch pedal, a brake pedal, a shift lever, and a control unit that performs inertia travel control to cause a vehicle to start inertia travel when a predetermined condition is satisfied during travel of the vehicle, performs free-run transition control to change to a free-run travel when a predetermined inertia travel time has elapsed since the start of the inertia travel, and sets the inertia travel time in a case where the last operation before the inertia travel is one of predetermined operation to be longer than the inertia travel time in a case where the last operation before the inertia travel is an operation in which the return speed of the accelerator pedal is greater than or equal to a predetermined return speed.

3 Claims, 5 Drawing Sheets

(56) References Cited

U.S. PATENT DOCUMENTS

| | | | | |
|---|---|---|---|---|
| 2012/0330505 | A1* | 12/2012 | Tsumori | B60W 10/06 |
| | | | | 701/36 |
| 2013/0073168 | A1* | 3/2013 | Jang | B60T 1/10 |
| | | | | 701/93 |
| 2015/0274166 | A1* | 10/2015 | Hirai | F02D 29/02 |
| | | | | 701/67 |
| 2015/0307103 | A1* | 10/2015 | Kuroki | F16H 61/21 |
| | | | | 701/70 |
| 2017/0072961 | A1* | 3/2017 | Yoon | B60W 30/18072 |
| 2017/0217438 | A1* | 8/2017 | Iwamoto | B60W 10/02 |
| 2018/0178795 | A1* | 6/2018 | Takada | B60W 10/02 |

* cited by examiner

VEHICLE CONTROL APPARATUS

CROSS-REFERENCE TO RELATED APPLICATION(S)

The present application claims priority to and incorporates by reference the entire contents of Japanese Patent Application No. 2016-091421 filed on Apr. 28, 2016.

BACKGROUND

1. Field of the Invention

The present disclosure related to a vehicle control apparatus.

2. Description of the Related Art

There is a known vehicle control apparatus configured to control free-run travel to reduce fuel consumption by disengaging a clutch provided in a vehicle and stopping an engine. For example, PCT International Publication No. WO 2013/027288 discloses a technique of judging whether to execute free-run travel control in a case where free-run travel is easily executed on the basis of a predetermined execution start condition. Moreover, Japanese Laid-open Patent Publication No. 2014-088825 describes a technique of performing travel by partially suspending engine cylinders at the time of travel in which neutral inertia travel would be suitably performed provided the vehicle satisfies a predetermined vehicle condition even in a case where it is not possible to perform neutral inertia travel.

SUMMARY

It is an object of the present disclosure to at least partially solve the problems in the conventional technology.

According to an embodiment of the present disclosure, a vehicle control apparatus for controlling a vehicle including an engine, a motor generator rotatably driving the engine, a manual transmission changing a gear shift of driving force input from the engine and outputting the gear-shifted driving force, a clutch engaging an output shaft of the engine with an input shaft of the manual transmission, an accelerator pedal, a clutch pedal, a brake pedal, and a shift lever, the vehicle control apparatus comprising a control unit performs inertia travel control to cause a vehicle to start inertia travel where the clutch is disengaged when a predetermined condition is satisfied during travel of the vehicle, performs free-run transition control to change from the inertia travel to a free-run travel by stopping the engine at a time point when a predetermined inertia travel time, in which the vehicle is in the inertia travel, has elapsed since the start of the inertia travel, and sets the inertia travel time in a case where the last operation before the inertia travel is one of a gear shift operation using the clutch pedal and the shift lever, an operation of the brake pedal, and an operation in which a return speed of the accelerator pedal is less than a predetermined return speed, to be longer than the inertia travel time in a case where the last operation before the inertia travel is an operation in which the return speed of the accelerator pedal is greater than or equal to the predetermined return speed.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

In the related art, in a case where a free-run travel execution condition is satisfied so that the engine is stopped and the free-run travel is started, when acceleration is requested from a driver, it is necessary to restart the engine in order to recover from the free-run travel to normal travel. Since this may take time to recover from the free-run travel to the normal travel, the start of acceleration of the vehicle may be delayed in response to the request from the driver and this may cause deterioration of drivability.

The present disclosure is made in view of at least one of the above problems and may provide a vehicle control apparatus capable of reducing time taken to recover to the normal travel while preventing deterioration of drivability by making it possible to promptly execute acceleration of the vehicle in a case where acceleration is requested by the driver of the vehicle under a situation where acceleration is more likely to be requested from the driver after the free-run travel execution condition has been satisfied.

Figure 1:
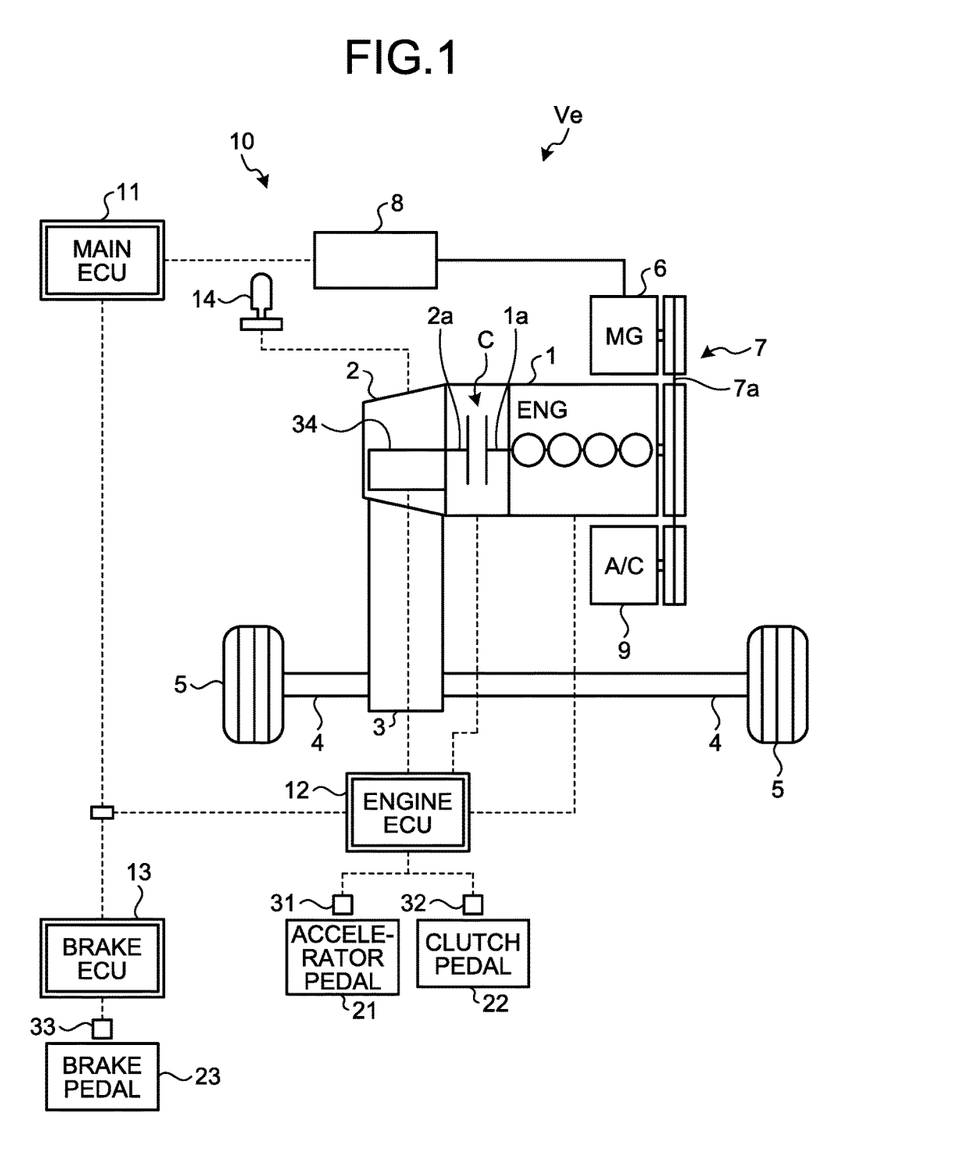
FIG. 1 is a schematic diagram illustrating a vehicle including a vehicle control apparatus according to an embodiment of the present disclosure.

Hereinafter, embodiments of the present disclosure will be described with reference to the accompanied drawings. Note that throughout the drawings of an embodiment, the same reference signs are used to denote the same or corresponding portions. Furthermore, it should be noted that the present disclosure is not limited to the embodiments described below First, a vehicle control apparatus according to an embodiment of the present disclosure will be described. FIG. 1 is a schematic diagram illustrating a vehicle including a vehicle control apparatus according to an embodiment.

As illustrated in FIG. 1, a vehicle Ve has a power transmission system, which includes an engine (ENG) 1 as a power source, a manual transmission 2, a differential gear 3, an axle 4, and a drive wheel 5. The vehicle Ve further includes a clutch C to connect or disconnect between the engine 1 and the manual transmission 2. The clutch C is provided between a crankshaft 1a as an output shaft of the engine 1, and an input shaft 2a of the manual transmission 2, within a power transmission path extending from the engine 1 to the drive wheel 5.

The engine 1 refers to an internal combustion engine, known as a prior art, such as a gasoline engine and a diesel engine. The manual transmission 2 refers to a transmission known as a prior art, in which a plurality of transmission steps with different gear ratios can be manually set, so as to shift driving force input from the engine 1 and output the force to the differential gear 3, the axle 4, and the drive wheel 5. Specifically, the manual transmission 2 switches the transmission step in accordance with a shift position of a shift lever 14 when the manual transmission 2 detects that the shift lever 14 coupled to the manual transmission 2 is operated by the driver.

The clutch C employs a hydraulic system that is selectively engageable or disengageable. A friction engagement element of the clutch C is operated by a hydraulic actuator. One friction engagement element of the clutch C is coupled to the crankshaft 1a, that is, an output shaft of the engine 1. Another friction engagement element is coupled to the input shaft 2a of the manual transmission 2. In the vehicle Ve, the engine 1 can be disconnected from the power transmission system by setting the clutch C to a disengaged state. On the contrary, the engine 1 can be connected to the power transmission system by torqueably connecting between the input shaft 2a and the crankshaft 1a by setting the clutch C to an engaged state. When the clutch C is in the engaged state, power (output torque) output from the engine 1 can be output to left and right drive wheels 5 coupled to the axle 4 via the manual transmission 2 and the differential gear 3. In the present description, the vehicle state in which the clutch C is in the engaged state and the vehicle travels by transmitting the output torque of the engine 1 to the drive wheels 5 will be referred to as a "normal travel state". Note that the clutch C is not limited to the hydraulic type but may be, for example, an electromagnetic type.

The vehicle Ve includes a motor generator (MG) 6 as a starter apparatus of the engine 1. The MG 6 is connected with the engine 1 via a transmission mechanism 7 so as to transmit power. The transmission mechanism 7 includes a pulley mechanism in which an endless transmission belt 7a is bridged between a pulley that integrally rotates with a rotor shaft of the MG 6 (drive-side pulley at engine start) and a pulley that integrally rotates with the crankshaft 1a (idle-side pulley at engine start). That is, since the MG 6 and the engine 1 are coupled with each other without the clutch C therebetween, the MG 6 and the engine 1 can be connected with each other so as to transmit power there between even when the clutch C is in the disengaged state. That is, the MG 6 can rotatably drive the engine 1 upon starting the engine 1.

The MG 6 is electrically connected with a battery 8 as a rechargeable battery so as to transmit and receive power with each other. Due to the configuration, the MG 6 can functions as a motor driven by the power supplied from the battery 8, in addition, the MG 6 functions as a generator as well to generate power by rotating of the rotor shaft by using an external force.

In a case where the MG 6 functions as a starter motor, the MG 6 is driven by consuming power from the battery 8 while the engine 1 is stopped, so that the power output from the MG 6 is transmitted to the engine 1 via the transmission mechanism 7 to rotate the crankshaft 1a. On the other hand, the case where the MG 6 functions as a generator includes a drive power generation and a regenerative generation. In the drive power generation, the power output from the engine 1 acts on the rotor shaft via the transmission mechanism 7, so that the rotor shaft is rotated to generate power. In the regenerative power generation, the clutch C is set to an engaged state, so that the external force from the drive wheel 5 side acts on the rotor shaft via a power transmission path and the transmission mechanism 7 to rotate the rotor shaft to generate power, that is, energy regeneration. The power generated by the MG 6 is charged in the battery 8. Due to the charge, a state of charge (SOC), representing a charging capacity of the battery 8, changes.

The battery 8 and the MG 6 are electrically connected with each other via, for example, an inverter (not illustrated). The inverter is controlled by a vehicle control apparatus 10 described below. The vehicle control apparatus 10 is electrically connected with the inverter so as to communicate with each other and can detect the SOC of the battery 8. Note that the inverter may also be electrically connected to, for example, an electrical device (not illustrated) and another MG (not illustrated).

The vehicle Ve includes an air compressor (A/C) 9 as an auxiliary apparatus. The air compressor 9 is connected with the engine 1 via the transmission mechanism 7 so as to receive power from the engine 1. The air compressor 9 is connected with the MG 6 as well so as to receive power from the MG 6 and can be driven by the MG 6 as needed basis.

The vehicle control apparatus 10 according to an embodiment includes an electronic control apparatus (hereinafter, a "main ECU") 11 to control the vehicle Ve as a whole, an electronic control apparatus (hereinafter, an "engine ECU") 12 to control the engine 1, and an electronic control apparatus (hereinafter, a "brake ECU") 13 to control an braking operation.

Each of the main ECU 11, the engine ECU 12, and the brake ECU 13 includes a microcomputer, as a main part, including a Central Processing Unit (CPU), a Read Only Memory (ROM), and a Random Access Memory (RAM). Each of the main ECU 11, the engine ECU 12, and the brake ECU 13 performs calculation using data loaded into the RAM, data pre-stored in the ROM, and the like, and outputs a result of calculation as a command signal.

The main ECU 11, which serves as a part of a control unit, is electrically communicatively connected with the engine ECU 12 and the brake ECU 13. The engine ECU 12 and the brake ECU 13 also serve as the control unit. In the vehicle control apparatus 10, the main ECU 11, the engine ECU 12, and the brake ECU 13 collaborate with each other to control the vehicle Ve. The vehicle Ve is equipped with various sensors. Signals from the various sensors are input into the main ECU 11. Also, various signals from the engine ECU 12 and the brake ECU 13 are input into the main ECU 11. The main ECU 11 performs various types of calculation processing on the basis of the input signals. In addition, the main ECU 11 outputs a command signal to control vehicle-mounted apparatuses including the engine ECU 12 and the brake ECU 13, which are to be controlled.

The main ECU 11 includes a control apparatus serving as a so-called motor ECU and a control apparatus called a battery ECU. The MG 6 and the battery 8 are controlled by the main ECU 11.

In the vehicle control apparatus 10, the main ECU 11 can obtain detection values such as the SOC and a battery voltage of the battery 8. For example, in a case where the main ECU 11 judges that the SOC is reduced and charging power to the battery 8 is needed, the main ECU 11 executes control so that the MG 6 functions as a generator and further executes control the inverter so that the power generated by the MG 6 is to be charged to the battery 8. In a case of starting the engine 1 on the basis of the input signal from the engine ECU 12, the main ECU 11 performs control so that the MG 6 can function as a starter motor using the power from the battery 8.

The engine ECU 12 controls a fuel supply rate and an air intake rate to the engine 1, and ignition timing of the engine 1. For example, an engine stop condition (free-run travel execution condition) is satisfied during travel of the vehicle Ve, the engine ECU 12 executes fuel cut control (F/C control) of stopping fuel supply (fuel injection) to the engine 1.

Moreover, the engine ECU 12 receives input of detection signals from an accelerator position sensor 31 detecting an amount of operation of an accelerator pedal 21 by the driver, and from a clutch stroke sensor 32 detecting an amount of operation of a clutch pedal 22 by the driver. The engine ECU 12 includes a control apparatus called a "clutch ECU".

For example, the engine ECU 12 can execute F/C control in a case where, during high-speed travel of the vehicle Ve, the engine ECU 12 detects that the driver takes one's foot off the accelerator pedal 21 (hereinafter, "accelerator-pedal-OFF") on the basis of a signal from the accelerator position sensor 31, and detects that the driver takes one's foot off the clutch pedal 22 (hereinafter, "clutch-pedal-OFF") on the basis of a signal from the clutch stroke sensor 32.

The brake ECU 13 controls an operation of a brake mounted on the vehicle Ve, more specifically, for example, an operation of a hydraulic type brake. Moreover, the brake ECU 13 receives input of signals from a brake stroke sensor 33 detecting an amount of an operation of a brake pedal 23 by the driver. For example, when the brake ECU 13 detects, during high-speed travel of the vehicle Ve, that the driver steps on the brake pedal 23 (hereinafter, "brake-pedal-ON") on the basis of a signal from the brake stroke sensor 33, the brake ECU 13 increases the hydraulic pressure to be acted on the brake. Meanwhile, the brake ECU 13 decreases the hydraulic pressure to be acted on the brake in a case where it detects that the driver akes one's foot off the brake pedal 23 (hereinafter, "brake-pedal-OFF").

Furthermore, the engine ECU 12 can execute inertia travel control and free-run transition control. The inertia travel control refers to control which causes the vehicle Ve to travel in a coast-mode while the engine 1 is in an operating state and the clutch C is in a disengaged state. The free-run transition control refers to control which stops the engine 1 during inertia travel and transitions the mode to free-run travel. Specifically, a inertia travel execution condition as a predetermined condition is satisfied in a case where the vehicle Ve is traveling with a predetermined speed or more, and all the conditions of the accelerator-pedal-OFF, the clutch-pedal-OFF, and the brake-pedal-OFF are satisfied, and, the engine ECU 12 starts the inertia travel control. Similarly, a free-run travel execution condition as a predetermined condition similar to the inertia travel execution condition is satisfied in a case where the vehicle Ve is traveling with a predetermined speed or more, and all the conditions of the accelerator-pedal-OFF, the clutch-pedal-OFF, and the brake-pedal-OFF are satisfied. If the vehicle is in the inertia travel when the free-run travel execution condition is satisfied, the engine ECU 12 executes the free-run transition control. Moreover, the vehicle control apparatus 10 can execute free-run control in response to a system request. Herein, the system request refers to an execution of control that is not based on an intention of the driver.

When the free-run travel of the vehicle Ve as described above is executed, the engine 1 does not consume fuel, so that fuel efficiency can be enhanced. In addition to this, since the clutch C is in the disengaged state, the engine 1 would not be rotated by the drive wheel 5, which makes it possible to reduce energy loss. Furthermore, by disconnecting the engine 1 from the power transmission system by disengaging the clutch C, it becomes possible to increase the travel distance of the vehicle Ve in the free-run travel state and thus to further enhance the fuel efficiency.

Moreover, when a predetermined free-run release condition is satisfied in the free-run state, the engine ECU 12 executes control of restarting the engine 1 (hereinafter, "engine restart control"). For example, in a case, during the free-run travel of the vehicle Ve, where the engine ECU 12 detects that the driver steps on the accelerator pedal 21 (hereinafter, "accelerator-pedal-ON") on the basis of a signal from the accelerator position sensor 31, or detects that the driver steps on the clutch pedal 22 (hereinafter, "clutch-pedal-ON") on the basis of a signal from the clutch stroke sensor 32, the free-run release condition by a driver's request is satisfied. Subsequently, while executing the engine restart control, the engine ECU 12 automatically engages the clutch C to terminate the free-run travel of the vehicle Ve.

Furthermore, the engine ECU 12 receives signal inputs from a vehicle speed sensor (not illustrated) detecting a vehicle speed, a sensor detecting a rotational speed of the crankshaft 1a (hereinafter, "engine rotational speed"), a sensor to detect rotational speed of the input shaft 2a (hereinafter, "input shaft rotational speed") of the manual transmission 2, a sensor to detect a current gear step of the manual transmission 2, and a neutral switch 34 detecting that the manual transmission 2 is neutral. The engine ECU 12 obtains the vehicle speed, the engine rotational speed, the input shaft rotational speed, the current gear step ("transmission step"), and a neutral state identification information. The vehicle control apparatus 10 executes control of synchronizing mutual rotational speed among the engagement elements when the clutch C is engaged. That is, the vehicle control apparatus 10 can control the engine rotational speed by using the MG6, so that the vehicle control apparatus 10 can execute control of synchronizing the engine rotational speed before engagement of the clutch C.

The engine ECU 12 includes a control apparatus (not illustrated) serving as a transmission ECU. The engine ECU 12 receives an input of a detection signal from a shift sensor detecting a shift position of the shift lever 14 and the shift lever operation by the driver. For example, the transmission ECU included in the engine ECU 12 can set to various states such as forward transmission step, reverse transmission step, or a neutral, and control of switching transmission steps ("transmission control") in accordance with the driver's request.

Figure 2:
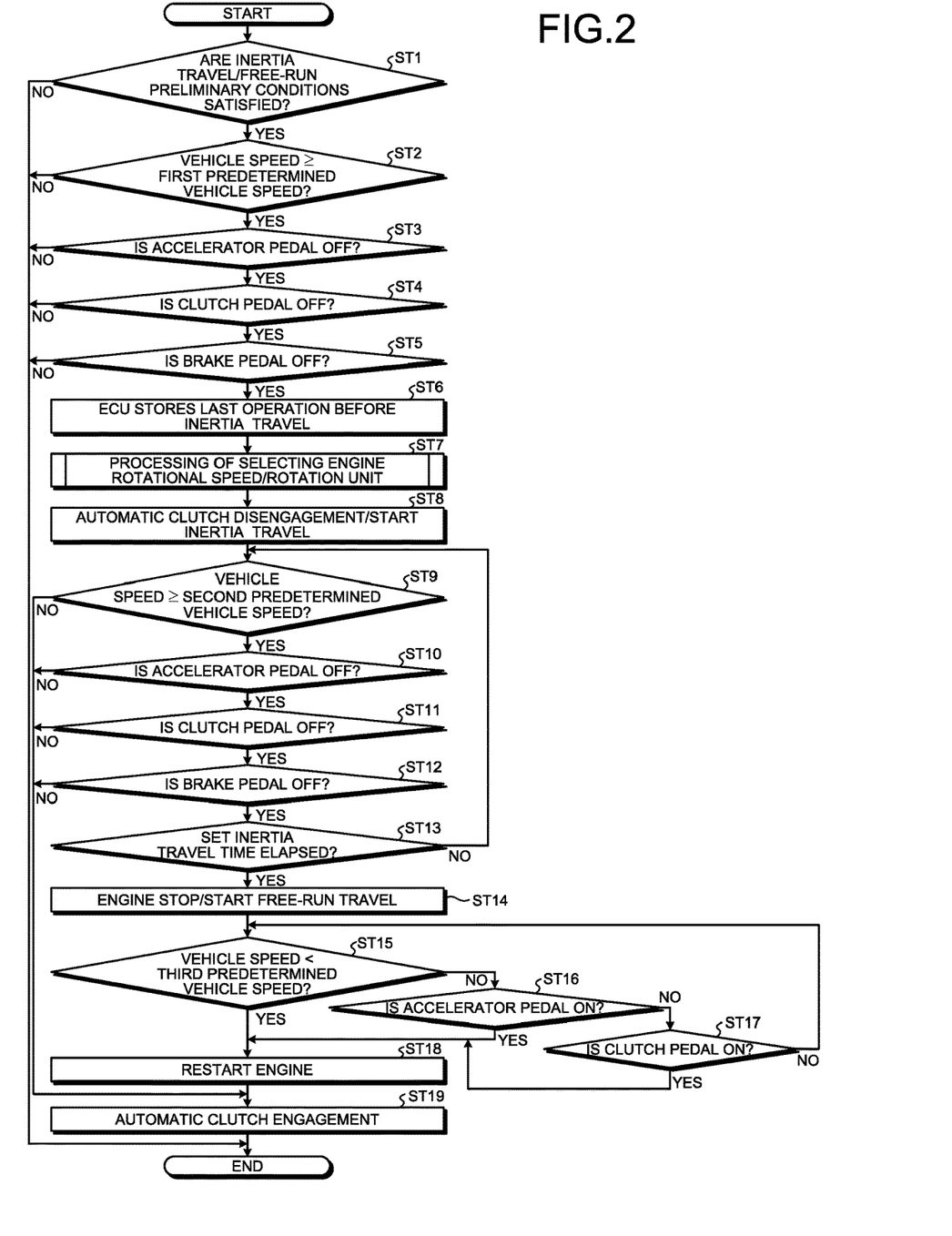
FIG. 2 is a flowchart illustrating a control method performed by a vehicle control apparatus according to an embodiment of the present disclosure.

Next, the inertia travel control and the free-run transition control according to an embodiment of the vehicle Ve including the vehicle control apparatus 10 will be described. FIG. 2 is a flowchart illustrating exemplary inertia travel control and free-run transition control according to an embodiment.

The main ECU 11, the engine ECU 12, and the brake ECU 13 execute the control flow illustrated in FIG. 2, where a process starts from a state where the vehicle Ve is controlled to the normal travel state. In the normal travel state, the vehicle Ve performs forward travel with the power of the engine 1 with the clutch C being in the engaged state.

First, in steps ST1 to ST5, the main ECU 11 determines whether the inertia travel execution condition as a condition for starting inertia travel is satisfied. Note that the inertia travel execution condition corresponds to a case where a preliminary condition for executing inertia travel is satisfied and any of the accelerator pedal 21, the clutch pedal 22, and the brake pedal 23 is off during normal travel of the vehicle Ve with the speed of first predetermined speed or more.

In step ST1, the main ECU 11 determines whether various preliminary conditions on the vehicle Ve as prerequisite for performing inertia travel and free-run travel with the vehicle Ve during normal travel of the vehicle Ve are satisfied. The preliminary conditions refer to prerequisite conditions for executing the inertia travel and the free-run travel, including the conditions such that the charging capacity (SOC) of the battery 8 is greater than or equal to a predetermined capacity, and an oil temperature of the manual transmission 2 satisfies a predetermined condition. Various known conditions can be adopted as the preliminary conditions. In a case where the main ECU 11 determines that the preliminary conditions are satisfied (step ST1: Yes), a process proceeds to step ST2.

In step ST2, the main ECU 11 determines whether the vehicle speed of the vehicle Ve is greater than or equal to the preset first predetermined vehicle speed on the basis of a vehicle speed measurement value supplied from a vehicle speed sensor (not illustrated) to the engine ECU 12. In a case where the main ECU 11 determines that the vehicle speed of the vehicle Ve is greater than or equal to the first predetermined vehicle speed (step ST2: Yes), a process proceeds to step ST3.

In step ST3, the main ECU 11 determines whether it is the accelerator-pedal-OFF during normal travel of the vehicle Ve on the basis of the signal supplied from the accelerator position sensor 31 to the engine ECU 12. In a case where the determination of the main ECU 11 is the accelerator-pedal-OFF (step ST3: Yes), a process proceeds to step ST4.

In step ST4, the main ECU 11 determines whether the clutch pedal 22 is off on the basis of the signal supplied from the clutch stroke sensor 32 to the engine ECU 12. In a case where the determination of the main ECU 11 is the clutch-pedal-OFF (step ST4: Yes), a process proceeds to step ST5. In step ST5, the main ECU 11 determines whether the brake pedal 23 is off on the basis of the signal supplied from the brake stroke sensor 33 to the brake ECU 13. In a case where the determination of the main ECU 11 is the brake-pedal-OFF (step ST5: Yes), it is determined that the inertia travel execution condition on the vehicle Ve is satisfied, and a process proceeds to step ST6.

In a case where the main ECU 11 determines that the preliminary condition for executing the inertia travel is not satisfied (step ST1: No) or determines that the vehicle speed is less than the first predetermined vehicle speed (step ST2: No), a control routine is finished. Similarly, in a case where the determination of the main ECU 11 is the accelerator-pedal-ON (step ST3: No), the clutch-pedal-ON (step ST4: No), or the brake-pedal-ON (step ST5: No), the control routine is finished. That is, the main ECU 11 continues the normal travel state without transitioning the vehicle Ve to the inertia travel.

In step ST6, at a time point when the inertia travel execution condition is satisfied, the main ECU 11 stores, in a memory, or the like, of the main ECU 11, the data indicating the operation (last operation before the inertia travel) performed by the driver in a previous stage of this time point. For example, the main ECU 11 stores, in a recording medium as the last operation before the inertia travel, the data indicating the pedal operation on the accelerator pedal 21, the pedal operation on the brake pedal 23, the pedal operation on the clutch pedal 22, or the gear shift operation performed by operating the clutch pedal 22 and the shift lever 14, performed last time by the driver. Thereafter, a process proceeds to step ST7.

In step ST7, the main ECU 11 executes a selection process of selecting engine rotational speed and a rotation unit. That is, while determining the engine rotational speed during the inertia travel, the main ECU 11 selects a rotation unit, that is, whether to allow the engine 1 to perform independent rotation during the inertia travel, or to rotate the engine 1 using the MG 6, or the like. Furthermore, the main ECU 11 sets a inertia travel time for which the inertia travel of the vehicle Ve is to be continued. For example, the inertia travel time is selected from a first predetermined time T1 and a second predetermined time T2, which is shorter than the first predetermined time T1 (T1>T2).

Figure 3:
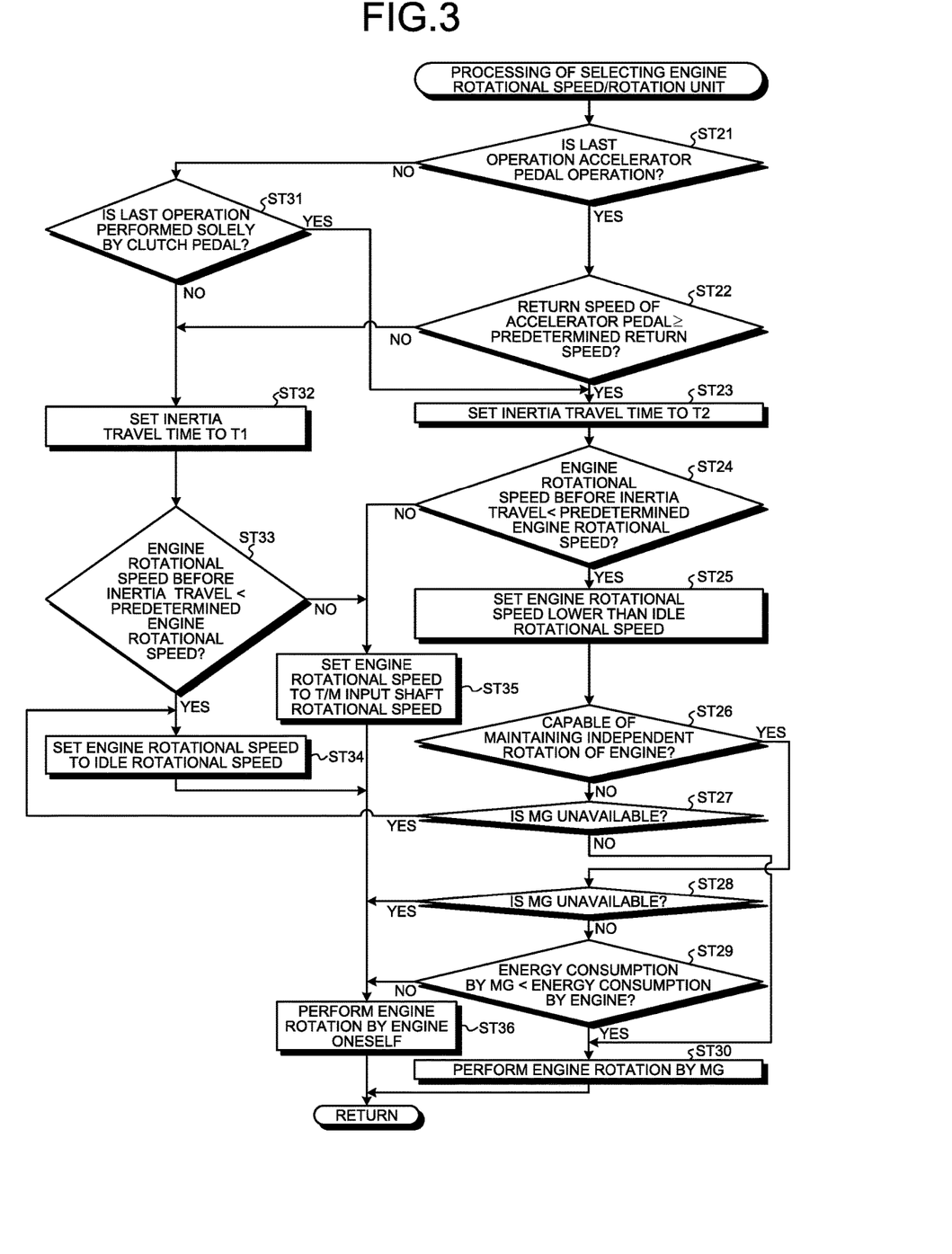
FIG. 3 is a flowchart for illustrating a selection processing method for engine rotational speed and a rotation unit, executed by a vehicle control apparatus according to an embodiment of the present disclosure.

Now, a process of selecting the engine rotational speed and the rotation unit (hereinafter, selection process) according to an embodiment will be described in more detail. FIG. 3 is a flowchart illustrating an exemplary selection processing method for selecting the engine rotational speed and the rotation unit according to an embodiment.

As illustrated in FIG. 3, in the selection process according to an embodiment, the main ECU 11 determines, in step ST21, whether the last operation before the inertia travel corresponds to the operation on the accelerator pedal 21. In a case where the last operation before the inertia travel corresponds to the operation on the accelerator pedal 21 (step ST21: Yes), a process proceeds to step ST22.

In step ST22, the main ECU 11 determines whether an absolute value of a change rate ACC_rate (negative value) for the change from the accelerator-pedal-ON to the accelerator-pedal-OFF, that is, the return speed of the accelerator pedal 21, is greater than or equal to the absolute value (predetermined return speed) of a preset predetermined change rate ACC_init (negative value). Note that the return speed of the accelerator pedal 21 is calculated by the engine ECU 12 on the basis of the signal that is supplied from the accelerator position sensor 31, and then is supplied to the main ECU 11. In a case where the return speed of the accelerator pedal 21 is greater than or equal to the predetermined return speed (step ST22: Yes), a process proceeds to step ST23.

In step ST23, the main ECU 11 selects the second predetermined time T2 (T1>T2) described below, that is shorter than the first predetermined time T1, as the inertia travel time on which the inertia travel is to be continued based. The second predetermined time T2 is approximately one to two seconds, for example. The first predetermined time T1 will be described in more detail below. This is because, in a case where the return speed of the accelerator pedal 21 is high, it is considered that driver's intention to perform acceleration is relatively weak. In this case, the time taken for the transition from the inertia travel to the free-run travel becomes shorter than the first predetermined time T1. Accordingly, an operating time of the engine 1 is reduced compared with the case where the inertia travel is continued for the first predetermined time T1, so that it becomes possible to enhance fuel efficiency. The selected second predetermined time T2 is stored in a memory, or the like, in the main ECU 11, as the inertia travel time. Thereafter, a process proceeds to step ST24.

In step ST24, the main ECU 11 determines whether the engine rotational speed at the time point when the inertia travel execution condition is satisfied (i.e., before the inertia travel) is less than a predetermined engine rotational speed. Note that the predetermined engine rotational speed can be set per vehicle Ve, for example, to approximately 3000 rpm. This is because, in a case where the engine rotational speed before the inertia travel is approximately 3000 rpm or higher, it is considered that a possibility of recovering from the inertia travel to normal travel is extremely high. In a case where the engine rotational speed before the inertia travel is less than the predetermined engine rotational speed (step ST24: Yes), a process proceeds to step ST25.

In step ST25, the main ECU 11 sets the engine rotational speed of the engine 1 during inertia travel to the speed less than the idle rotational speed. The engine rotational speed to be set less than the idle rotational speed is set to the rotational speed outside a resonance zone, and to the rotational speed where autonomous recovery of the engine 1 can be achieved. Specifically, the rotational speed is set to approximately 200 to 300 rpm, for example. This is because, in a case where the second predetermined time T2 is selected as the inertia travel time and where the engine rotational speed before the inertia travel is less than the predetermined engine rotational speed, there is a high possibility of transition from the inertia travel to the free-run travel. With this configuration, it becomes possible to maintain the engine rotational speed during inertia travel in a low speed, so that fuel efficiency can be enhanced. After processing of step ST25 is finished, a process proceeds to step ST26.

In step ST26, the main ECU 11 determines whether the engine rotational speed set in step ST25 corresponds to the rotational speed capable of maintaining independent rotation of the engine 1. In a case where the main ECU 11 determines that the set engine rotational speed does not corresponds to the rotational speed capable of maintaining the independent rotation of the engine 1 (step ST26: No), a process proceeds to step ST27. In step ST27, the main ECU 11 determines whether the MG 6 is unavailable on the vehicle Ve. Note that the case where the MG 6 is unavailable includes not only a case where the SOC of an MG power source (not illustrated) used for driving of the MG 6 is too low to drive the MG 6, but also the case where the engine 1 is in a cold condition. In a case where the main ECU 11 determines that the MG 6 is available (step ST27: No), a process proceeds to step ST30. In step ST30, the main ECU 11 sets the rotation of the engine 1 during inertia travel to be performed by the MG 6. The above-described operation completes the selection process routine.

In a case where, in step ST26, the main ECU 11 determines that the engine rotational speed set in step ST25 corresponds to the rotational speed capable of maintaining the independent rotation of the engine 1 (step ST26: Yes), a process proceeds to step ST28. The process in step ST28 is a determination process similar to that in step ST27. In a case where the main ECU 11 determines that the MG 6 is available (step ST28: No), a process proceeds to step ST29. Note that in a case where the main ECU 11 determines that the MG 6 is unavailable (step ST28: Yes), a process proceeds to step ST36 described below.

In step ST29, the main ECU 11 compares the energy consumption between a case where the MG 6 is used and a case where the independent rotation of the engine 1 is maintained, when the engine 1 is rotated at the engine rotational speed which is less than the idle rotational speed set in step ST25. That is, the main ECU 11 determines whether the energy consumption in a case where the independent rotation of the engine 1 is maintained is greater than the energy consumption in a case where the engine 1 is rotated by the MG 6 when the engine 1 is rotated at the engine rotational speed which is less than the set idle rotational speed.

Figure 4:
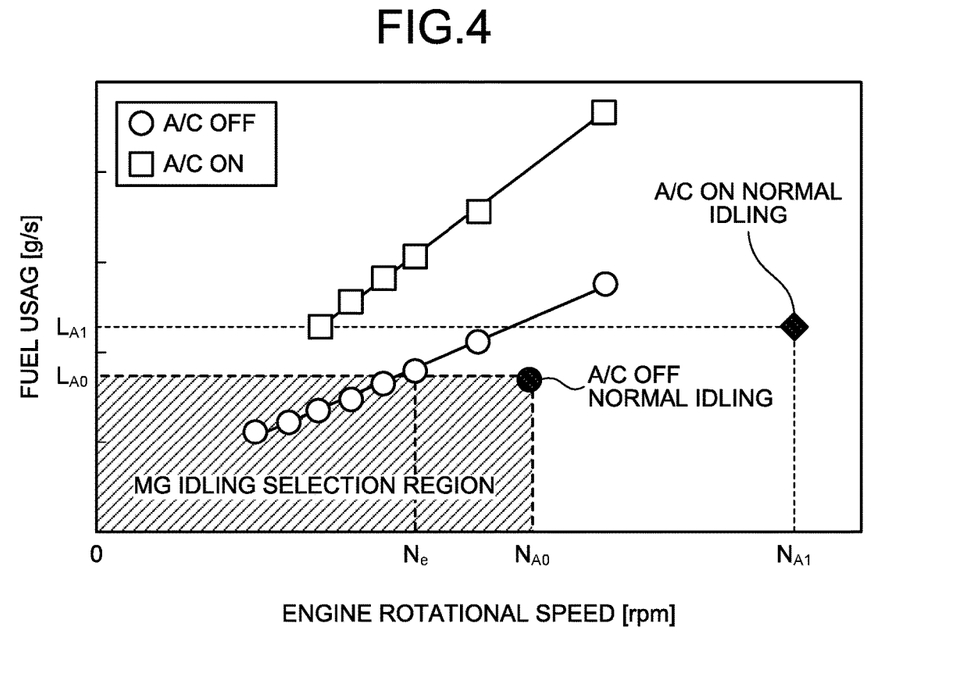
FIG. 4 is a graph illustrating an example of fuel usage of an engine and an MG relative to engine rotational speed according to an embodiment of the present disclosure.

Now, a detail of the determination process of determining whether to use the MG 6 for rotating the engine 1, in accordance with the consumed energy, will be described. FIG. 4 is a graph illustrating an exemplary fuel usage of the engine 1 and the MG 6 per engine rotational speed of the vehicle Ve, according to an embodiment. Note that the fuel usage in FIG. 4 in the case of the engine 1 represents the amount of fuel that is actually consumed. The fuel usage of the MG 6 represents values obtained by converting the electrical energy consumption into the amount of fuel to be used. The graph illustrated in FIG. 4 can be derived for each vehicle Ve in accordance with vehicle specifications of the vehicle Ve and the type of MG mounted. In FIG. 4, "○ (open circle)" represents a dependency of the MG 6 fuel usage on the engine rotational speed (hereinafter may be referred to as "the engine rotational speed dependency of the fuel usage of the MG 6 ") in a state where the A/C 9 is off. "□ (open square)" represents the dependency of the MG 6 fuel usage on the engine rotational speed in a state where A/C 9 is on. Moreover, "A/C off normal idling" in FIG. 4 indicated by "● (filled circle)" represents fuel usage $L_{A0}$ and idle rotational speed $N_{A0}$ of the engine 1 in a state where the A/C 9 is off. "A/C on normal idling" indicated by "♦ (filled diamond)" represents fuel usage $L_{A1}$ and idle rotational speed $N_{A1}$ of the engine 1 in a state where the A/C 9 is on. Note that the idle rotational speed $N_{A1}$ in a state where the A/C 9 is on is normally higher than the idle rotational speed $N_{A0}$ in a state where the A/C 9 is off ($N_{A0} < N_{A1}$)

In an example illustrated in FIG. 4, it is understandable that in any of the case where the A/C 9 is off and the case where the A/C 9 is on, the fuel usage of the MG 6 decreases as the engine rotational speed decreases. In addition, in a case where the engine rotational speed that has been set in step ST25 of FIG. 3 is less than the predetermined engine rotational speed $N_e$, which is less than the idle rotational speed $N_{A0}$ of FIG. 4, and provided that the A/C 9 is in the off state, the fuel usage corresponding to the energy consumption in a case where the engine 1 is rotated by the MG 6 is less than the fuel usage $L_{A0}$ corresponding to the energy consumption in a case where the engine 1 performs independent rotation. That is, it is understandable that, when the engine rotational speed dependency of the fuel usage of the MG 6 is within a region where the engine rotational speed is less than the idle rotational speed $N_{A0}$ and the fuel usage is less than the fuel usage $L_{A0}$ (the hatched region in FIG. 4: "MG idling selection region") in a case where the engine 1 is rotated by the MG 6, it is possible to further reduce energy consumption by performing rotation of the engine 1 by the MG 6 rather than by independent rotation.

In this case, in step ST29 of FIG. 3, the main ECU 11 determines that the energy consumption in the case of rotating the engine 1 by the MG 6 is less than the energy consumption in the case of performing rotation of the engine 1 by independent rotation (step ST29: Yes), and a process proceeds to step ST30. In step ST30, the main ECU 11 sets such that the rotation of the engine 1 during inertia travel is to be performed by the MG 6, and thereafter, finishes the selection process routine.

Meanwhile, in a case, in an example illustrated in FIG. 4, where the A/C 9 is in the off state and the set engine rotational speed is greater than or equal to the predetermined engine rotational speed $N_e$, the fuel usage corresponding to the energy consumption when the engine 1 is rotated by the MG 6 is greater than or equal to the fuel usage $L_{A0}$ corresponding to the energy consumption when the engine 1 performs independent rotation. In this manner, in a case where the engine 1 is rotated by the MG 6 when the engine rotational speed dependency of the fuel usage of the MG 6 is outside the selection region (hatched region) of idling by MG 6, the energy consumption when the independent rotation of the engine 1 is performed is less than the energy consumption when the engine 1 is rotated by the MG 6. Moreover, in a of an example of FIG. 4, in a case where the A/C 9 is in an on state, even when the engine rotational speed is less than the idle rotational speed $N_{A1}$, the fuel usage corresponding to the energy consumption when the engine 1 is rotated by the MG 6 is greater than or equal to the fuel usage $L_{A1}$ corresponding to the energy consumption when the independent rotation of the engine 1 is performed.

In this case, in step ST29 of FIG. 3, the main ECU 11 determines that the energy consumption in the case of rotating the engine 1 by the MG 6 is greater than or equal to the energy consumption in the case of rotating the engine 1 by independent rotation (step ST29: No), and a process proceeds to step ST36. In step ST36, the main ECU 11 sets such that the rotation of the engine 1 during inertia travel is to be performed by the engine 1 by oneself, and thereafter, finishes the selection process routine.

Meanwhile, in a case, in step ST21 of FIG. 3, where the main ECU 11 determined that the last operation before the inertia travel is not the operation of the accelerator pedal 21 (step ST21: No), a process proceeds to step ST31. In step ST31, the main ECU 11 determines whether the last operation before the inertia travel is the operation performed solely by the clutch pedal 22, that is, whether the shift lever 14 is operated while operation of the clutch pedal 22 is performed. In a case where the main ECU 11 determines that the last operation before the inertia travel is the operation performed solely by the clutch pedal 22 (step ST31: Yes), a process proceeds to step ST23, and the selection process of the step ST23 and the later steps are executed similar to the above-described process.

In contrast, in a case, in step ST31, where the main ECU 11 determines that the last operation before the inertia travel is not the operation performed solely by the clutch pedal 22 (step ST31: No), a process proceeds to step ST32. Note that the case where the operation is neither the operation of the accelerator pedal 21 nor the operation performed solely by the clutch pedal 22 is the case where the last operation before the inertia travel is the operation of the brake pedal 23 or the case of gear shift operation in which the shift lever 14 is operated while the clutch pedal 22 is operated. Moreover, also in a case, in step ST22, where the main ECU 11 determines that the return speed of the accelerator pedal 21 is less than the predetermined return speed (step ST22: No), a process proceeds to step ST32.

In a case where the last operation before the inertia travel is the operation of the brake pedal 23, it is highly possible that the driver intends to perform re-acceleration after operation of the brake pedal 23 is finished, and thus, re-acceleration is expected. Similarly, also in a case where the last operation before the inertia travel is gear shift operation combining operation of the clutch pedal 22 and operation of the shift lever 14, it is highly possible that the driver intends to perform re-acceleration after the gear shift operation is finished, and thus, re-acceleration is expected. Furthermore, in a case where the return speed of the accelerator pedal 21 is less than the predetermined return speed, it is expected that the driver intends to perform re-acceleration even after the operation of the accelerator pedal 21, and thus, re-acceleration is likely to occur. Therefore, when the inertia travel time is reduced in these cases, the engine 1 is more likely to be restarted for re-acceleration immediately after transition to the free-run travel by stopping the engine 1, from the inertia travel. Short-time stop and restart of the engine 1 may lead to deterioration of fuel efficiency. To address this matter, the inertia travel time is set to the first predetermined time T1 that is longer than the second predetermined time T2 so as to extend the time taken for transition from the inertia travel to the free-run travel. This can increase the possibility that the engine 1 is in an operating state when re-acceleration is requested to the engine ECU 12, and thus can decrease the possibility of occurrence of short-time stop and restart of the engine 1. As a result, it becomes possible to prevent deterioration of fuel efficiency.

In step ST32, the main ECU 11 selects the above-described first predetermined time T1 (T1>T2) that is longer than the second predetermined time T2 as the inertia travel time which is the time to continue the inertia travel. The first predetermined time Tl is approximately 1.5 to 3 seconds, for example. The selected inertia travel time is stored in a predetermined recording medium. Thereafter, a process proceeds to step ST33.

In step ST33, similar to step S24, the main ECU 11 determines whether the engine rotational speed before the inertia travel is less than the predetermined engine rotational speed. In a case where the engine rotational speed before the inertia travel is less than the predetermined engine rotational speed (step ST33: Yes), a process proceeds to step ST34. Also, in step ST27, when the main ECU 11 determines that the MG 6 is unavailable (step ST27: Yes), a processing proceeds to step ST34.

In step ST34, the main ECU 11 sets the engine rotational speed of the engine 1 during inertia travel to the idle rotational speed. This is because, in a case where the first predetermined time T1 longer than the second predetermined time T2 is selected as the inertia travel time and the engine rotational speed before the inertia travel is less than the predetermined engine rotational speed, there is a possibility of recovering from the inertia travel to the normal travel. This can maintain re-acceleration performance in the case of recovering from the inertia travel to the normal travel and can also prevent deterioration of fuel efficiency. Note that, in a case where the possibility of re-acceleration of the vehicle Ve is low, the engine 1 cannot perform independent rotation at the engine rotational speed which is less than the idle rotational speed, and the MG 6 is unavailable, the engine rotational speed is set to the idle rotational speed so as to cause the engine 1 to perform idle rotation. Thereafter, a proces ceeds to step ST36, and the main ECU 11 sets such that the rotation of the engine 1 during inertia travel is to be performed by the engine 1 by oneself, and then, finishes the selection process routine.

In step ST24, when the main ECU 11 determines that the engine rotational speed before the inertia travel is greater than or equal to the predetermined engine rotational speed (step ST24: No), a process proceeds to step ST35. Similarly, in step ST33, when the main ECU 11 determines that the engine rotational speed before the inertia travel is greater than or equal to the predetermined engine rotational speed (step ST33: No), a process proceeds to step ST35.

In step ST35, the main ECU 11 sets the engine rotational speed of the engine 1 during the inertia travel, to the input shaft rotational speed ("T/M input shaft rotational speed") of the manual transmission 2. This is because, regardless of the last operation before the inertia travel, in a case where the engine rotational speed before the inertia travel is greater than or equal to the predetermined engine rotational speed, it is considered that there is a high possibility of recovering from the inertia travel to the normal travel. Accordingly, the engine rotational speed of the engine 1 is synchronized with the input shaft rotational speed of the manual transmission 2, thereby maintaining re-acceleration performance at the time of recovering from the inertia travel to the normal travel. Thereafter, a process proceeds to step ST36, and the main ECU 11 sets such that the rotation of the engine 1 during inertia travel is to be performed by the engine 1 by oneself, and then, finishes the selection process routine.

Moreover, as a result of the above process in steps ST21 to ST25 and steps ST31 to ST34, the main ECU 11 assumes that the engine rotational speed before the inertia travel is less than the predetermined engine rotational speed and the MG 6 is available and selects the engine rotational speed during the inertia travelinertia travel. Specifically, in a case where the last operation before the inertia travel is one of the gear shift operation using the clutch pedal 22 and the shift lever 14, the operation of the brake pedal 23, and the operation in which the return speed of the accelerator pedal 21 is less than the predetermined return speed, control is performed so that the engine rotational speed during the inertia travel is greater than the engine rotational speed when the last operation before the inertia travel is the operation in which the return speed of the accelerator pedal 21 is greater than or equal to the predetermined return speed. By doing this, when the driver is more likely to perform re-acceleration, it becomes possible to maintain a state of high engine rotational speed of the engine 1. Accordingly, it becomes possible to promptly perform re-acceleration even in a case where the accelerator is stepped on by the driver during inertia travel, and to secure re-acceleration responsiveness.

The above operation completes the selection process according to an embodiment (step ST7 in FIG. 2), and then, suitable values and units are selected for the following parameters (a), (b), and (c).

(a) Inertia travel time before free-run travel
(a-1) First predetermined time T1
(a-2) Second predetermined time T2
(b) Engine rotational speed during inertia travel
(b-1) Idle rotational speed or less (200 to 300 rpm)
(b-2) Idle rotational speed
(b-3) Input shaft rotational speed of manual transmission 2
(c) Engine rotation unit during inertia travel
(c-1) Independent rotation of engine 1
(c-2) Driving by MG 6

After selection process is finished, a process proceeds to step ST8 of FIG. 2. In step ST8, the engine ECU 12 allows the clutch C to be automatically disengaged by performing disengage control of the clutch C. This starts the inertia travel of the vehicle Ve in a state where the engine 1 is driven.

Thereafter, a process proceeds to step ST9 of FIG. 2. Similarly to step ST2, the main ECU 11 determines whether the vehicle speed of the vehicle Ve is greater than or equal to a preset second predetermined vehicle speed. In a case it is determined that the vehicle speed is greater than or equal to the second predetermined vehicle speed (step ST9: Yes), a process proceeds to step ST10. Note that the second predetermined vehicle speed may be the same as or different from the first predetermined vehicle speed.

Next, the main ECU 11 determines, in step ST10, whether it is the accelerator-pedal-OFF, similarly to step ST3. In a case where the determination is the accelerator-pedal-OFF (step ST10: Yes), a process proceeds to step ST11. The main ECU 11 determines, in step ST11, whether it is the clutch-pedal-OFF, similarly to step ST4. In a case where the determination is the clutch-pedal-OFF (step ST11: Yes), a process proceeds to step ST12. The main ECU 11 determines, in step ST12, whether it is the brake-pedal-OFF, similarly to step ST5. In a case where the determination is the brake-pedal-OFF (step ST12: Yes), a process proceeds to step ST13.

Meanwhile, in a case where the determination of the main ECU 11 is that the vehicle speed is below the second predetermined vehicle speed (step ST9: No), the accelerator-pedal-ON (step ST10: No), the clutch-pedal-ON (step ST11: No), or the brake-pedal-ON (step ST12: No), a process proceeds to step ST19 described below.

In step ST13, the main ECU 11 determines whether the inertia travel time that has elapsed since the start of the inertia travel to the current time point is equal to or greater than the inertia travel time set in step ST7. When the main ECU 11 determines that the inertia travel time is less than the set inertia travel time (step ST13: No), a processing goes back to step ST9, to repeat the processes in steps ST9 through ST12 simultaneously or sequentially (time points t1 to t2 in FIG. 5). In contrast, when the main ECU 11 determines that the inertia travel time that has elapsed is equal to or greater than the inertia travel time set in step ST7 (time point t2 in FIG. 5) (step ST13: Yes), a process proceeds to step ST14.

In step ST14, the engine ECU 12 stops fuel supply into the engine 1 to cause the engine 1 to automatically stop. The control of these steps ST9 to ST12 refers to the free-run transition control. By this control, the engine ECU 12 transitions the travel state of the vehicle Ve to the free-run travel.

Figure 5:
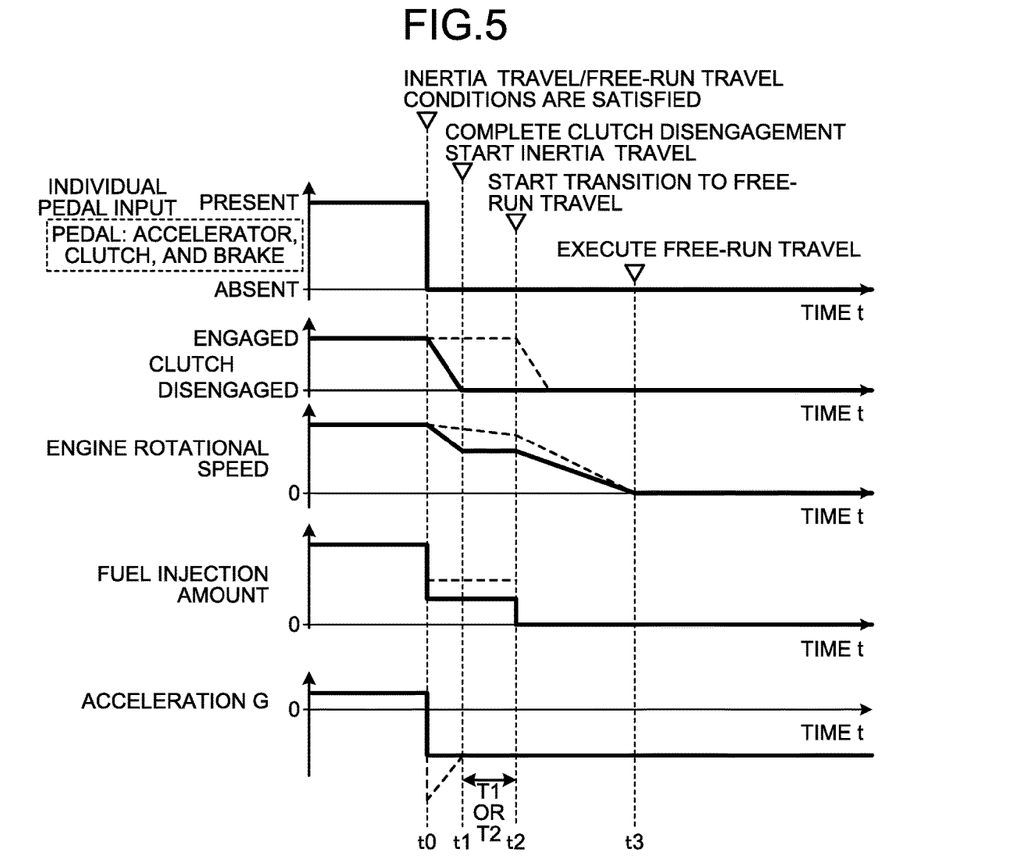
FIG. 5 is a time chart illustrating a transition change in a vehicle state in a case where a normal travel state is transitioned to a free-run state via inertia travel, by a vehicle control apparatus according to an embodiment of the present disclosure.

FIG. 5 is a timing chart illustrating the travel state of the vehicle Ve according to an embodiment. As illustrated in FIG. 5, the disengage control of the clutch C from the engaged state is started at a time point t0 on which the inertia travel execution condition is satisfied, and the clutch C comes in a disengaged state at the time point t1. The fuel injection amount is decreased at the time point t0 or later, and together with this, the engine rotational speed is also decreased. Along with the disengage control of the clutch C, the vehicle Ve performs inertia travel across the time points t1 to t2, in which the clutch C is in the disengaged state and the engine 1 is driven, while the engine rotational speed is substantially maintained constant. The period across the time points t1 to t2 corresponds to the above-described inertia travel time (T1 and T2). When the fuel injection amount stops at the time point t2, the transition to the free-run travel is started. The engine rotational speed is decreased and the engine 1 stops at a time point t3. At the time point t3, the engine 1 stops while the clutch C is in the disengaged state, and the vehicle Ve transitions to the free-run travel. Note that the broken line in FIG. 5 indicates control by the prior art.

In a prior art, the disengage control of the clutch C is started at the time point t2 (>t1) of transitioning to the free-run travel, and the clutch C is in the engaged state between the time point t0 on which the free-run travel execution condition similar to the inertia travel execution condition is satisfied, and the time point t2 of transitioning to the free-run travel. In this case, a state of high engine rotational speed is maintained, with the fuel injection amount being large. Furthermore, since the clutch C is in the engaged state, engine braking acts on the vehicle Ve when the fuel injection amount is decreased with no pedal inputs. This causes abrupt change in acceleration G before transitioning to the free-run travel, which deteriorates drivability.

In contrast, according to an embodiment, since the disengage control of the clutch C is started at the time point t0 on which the inertia travel execution condition is satisfied, it is possible to decrease the engine rotational speed and decrease the fuel injection amount to maintain the engine rotational speed. As a result, it becomes possible to reduce the fuel consumption amount. Furthermore, by performing the disengage control of the clutch C from the time point t0, it becomes possible to decrease the effects of engine braking on the vehicle Ve, and thus, to prevent an abrupt change in the acceleration G.

Thereafter, in steps ST15, ST16, and ST17 of FIG. 2, the main ECU 11 determines whether the condition ("free-run recovery condition") for recovering the vehicle Ve from free-run travel to normal travel is satisfied. According to an embodiment, the free-run recovery condition corresponds to any of the cases where the vehicle speed is less than a third predetermined vehicle speed, the accelerator pedal 21 is on, and the clutch pedal 22 is on, during the free-run travel of the vehicle Ve.

That is, in step S15, the main ECU 11 determines whether the vehicle speed is less than the preset third predetermined vehicle speed, during free-run travel of the vehicle Ve, on the basis of a signal from the vehicle speed sensor. Note that the third predetermined vehicle speed may be the same as or different from the first predetermined vehicle speed/second predetermined vehicle speed. When the main ECU 11 determines that the vehicle speed of the vehicle Ve is less than the third predetermined vehicle speed (step ST15: Yes), a process proceeds to step ST18 described below. In contrast, when the main ECU 11 determines that the vehicle speed of the vehicle Ve is greater than or equal to the third predetermined vehicle speed (step ST15: No), a process proceeds to step ST16.

In step ST16, the main ECU 11 determines, during free-run travel of the vehicle Ve, whether it is the accelerator-pedal-ON on the basis of the signal from the accelerator position sensor 31. In a case where the determination of the main ECU 11 is the accelerator-pedal-ON (step ST16: Yes), a process proceeds to step ST18 described below. In contrast, in a case where the determination of the main ECU 11 is the accelerator-pedal-OFF (step ST16: No), a process proceeds to step ST17.

In step ST17, the main ECU 11 determines whether it is the clutch-pedal-ON on the basis of the signal from the clutch stroke sensor 32. In a case where the determination of the main ECU 11 is the clutch-pedal-ON (step ST17: Yes), a process proceeds to step ST18. In contrast, in a case where the determination of the main ECU 11 is the clutch-pedal-OFF (step ST17: No), a process goes back to step ST15. The main ECU 11 repeats steps ST15 through ST17 until the free-run recovery condition is satisfied. When the free-run recovery condition is satisfied, a process proceeds to step ST18.

In step ST18, the engine ECU 12 performs the engine restart control to restart the engine 1. When a process proceeds from steps ST9 though ST12 or from step ST18 to step ST19, the engine ECU 12 controls to allow the clutch C to be automatically engaged. Execution of step ST19 causes the clutch C to be in an engaged state and causes the engine 1 to be in a drive state, and thus, the free-run travel of the vehicle Ve is finished. By recovery of the travel state of the vehicle Ve from the free-run travel to the normal travel, the control routine is finished.

According to an embodiment, the inertia travel time (first predetermined time T1) in a case where the operation before inertia travel corresponds to one of the gear shift operation using the clutch pedal 22 and the shift lever 14, the operation of the brake pedal 23, and the operation in which the return speed of the accelerator pedal 21 is less than the predetermined return speed, is set to be longer than the inertia travel time (second predetermined time T2) in a case where the operation in which the return speed of the accelerator pedal 21 is greater than the predetermined return speed. Accordingly, it becomes possible to increase the inertia travel time in a case where there is a high possibility of re-acceleration after the free-run travel execution condition is satisfied. Therefore, in a case where there is a condition of high possibility of re-acceleration by the driver, it becomes possible to prevent the deterioration of drivability by promptly executing re-acceleration with reduced time needed to recover to the normal travel in response to the re-acceleration request from the driver.

According to an embodiment, engine rotational speed is set higher in a case where the driver is more likely to request acceleration during inertia travel. Due to this, it becomes possible to enhance acceleration responsiveness when acceleration is requested by an operation of the accelerator pedal by the driver during inertia travel and prevent degradation of drivability. In a case where there is one of gear shift operation using a clutch pedal and a shift lever, operation of a brake pedal, or operation in which return speed of the accelerator pedal is less than a predetermined return speed, before starting the inertia travel, it is more likely that the driver will request acceleration than in a case where the return speed of the accelerator pedal is greater than or equal to the predetermined return speed.

According to an embodiment, engine rotational speed is maintained to a level below idle rotational speed by the motor generator during inertia travel. Therefore it becomes possible to suppress fuel consumption of the engine. In a case where the return speed of the accelerator pedal is greater than or equal to the predetermined return speed, it is considered that the driver is less likely to request for acceleration, and thus, it is desirable to put higher priority on enhancement of fuel efficiency.

In the vehicle control apparatus'according to an embodiment, the inertia travel time in a case where an operation performed before execution of the inertia travel is one of a gear shift operation using a clutch pedal and a shift lever, an operation of a brake pedal, and an operation in which the return speed of the accelerator pedal is less than the predetermined return speed, is set longer than the inertia travel time for a case where the operation in which the return speed of the accelerator pedal is greater than or equal to the predetermined return speed. Accordingly, under a situation where acceleration is more likely to be requested by the vehicle driver after free-run travel execution condition is satisfied, it becomes possible to reduce time to recover to the normal travel in a case where acceleration is requested by the vehicle driver, and prevent deterioration of drivability by promptly executing acceleration of the vehicle.

Although the embodiment of the present disclosure has been specifically described above, the present disclosure is not limited to the above-described embodiment, but it is possible to have various modifications based on the technical ideas of the present disclosure. For example, the numerical values in the above-described embodiment are merely examples, and it is allowable to use numerical values different from these as needed.

For example, the order of steps ST2, ST3, ST4, and ST5 in the above-described embodiment is not limited to the order described. The steps may be executed simultaneously or in an order different from the above-described order. Similarly, the order of steps ST9 through ST12 is not limited to the order described. The steps may be executed simultaneously or in an order different from the above-described order.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control apparatus for controlling a vehicle including an engine, a motor generator rotatably driving the engine, a manual transmission changing a gear shift of driving force input from the engine and outputting the gear-shifted driving force, a clutch engaging an output shaft of the engine with an input shaft of the manual transmission, an accelerator pedal, a clutch pedal, a brake pedal, and a shift lever, the vehicle control apparatus comprising a control unit configured to perform inertia travel control to cause a vehicle to start inertia travel where the clutch is disengaged when a predetermined condition is satisfied during travel of the vehicle, perform free-run transition control to change from the inertia travel to a free-run travel by stopping the engine at a time point when a predetermined inertia travel time, in which the vehicle is in the inertia travel, has elapsed since the start of the inertia travel, and set the inertia travel time in a case where the last operation before the inertia travel is one of a gear shift operation using the clutch pedal and the shift lever, an operation of the brake pedal, and an operation in which a return speed of the accelerator pedal is less than a predetermined return speed, to be longer than the inertia travel time in a case where the last operation before the inertia travel is an operation in which the return speed of the accelerator pedal is greater than or equal to the predetermined return speed.

2. The vehicle control apparatus according to claim 1, wherein, in a case where the motor generator is available and the engine rotational speed before the inertia travel is less than a predetermined engine rotational speed, the control unit is configured to set the engine rotational speed during the inertia travel in a case where the last operation before the inertia travel is one of the gear shift operation using the clutch pedal and the shift lever, the operation of the brake pedal, and the operation in which the return speed of the accelerator pedal is less than the predetermined return speed to be greater than the engine rotational speed during the inertia travel in a case where the last operation before the inertia travel is the operation in which the return speed of the accelerator pedal greater than or equal to the predetermined return speed.

3. The vehicle control apparatus according to claim 2, wherein, in a case where the last operation before the inertia travel is the operation in which the return speed of the accelerator pedal is greater than or equal to the predetermined return speed, the control unit is configured to perform control to maintain the engine rotational speed during the inertia travel at a speed less than an idle rotational speed by driving the motor generator.

* * * * *